United States Patent
Yang et al.

(10) Patent No.: US 12,236,042 B2
(45) Date of Patent: Feb. 25, 2025

(54) METHOD OF PREVENTING FALSE TRIGGERING, WEARABLE DEVICE AND STORAGE MEDIUM

(71) Applicant: GOERTEK INC., Shandong (CN)

(72) Inventors: Zongxu Yang, Shandong (CN); Shupeng Li, Shandong (CN); Guiming Cao, Shandong (CN); Tao Sui, Shandong (CN); Shumin Tan, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/559,346

(22) PCT Filed: Oct. 25, 2021

(86) PCT No.: PCT/CN2021/125989
§ 371 (c)(1),
(2) Date: Nov. 7, 2023

(87) PCT Pub. No.: WO2023/273039
PCT Pub. Date: Jan. 5, 2023

(65) Prior Publication Data
US 2024/0241603 A1 Jul. 18, 2024

(30) Foreign Application Priority Data

Jun. 30, 2021 (CN) .......................... 202110741520.8

(51) Int. Cl.
*G06F 3/041* (2006.01)
(52) U.S. Cl.
CPC .......... *G06F 3/0418* (2013.01); *G06F 3/0414* (2013.01)
(58) Field of Classification Search
CPC .............................. G06F 3/0418; G06F 3/0414
See application file for complete search history.

(56) References Cited

U.S. PATENT DOCUMENTS 10,999,421 B1 * 5/2021 Yama ................ H04M 1/72454
2017/0090599 A1 * 3/2017 Kuboyama .......... H03K 17/962
(Continued)

FOREIGN PATENT DOCUMENTS

| CN | 105758452 A | 7/2016 |
| CN | 106354321 A | 1/2017 |

(Continued)

OTHER PUBLICATIONS

International Search Report from International Application No. PCT/CN2021/125989 mailed Feb. 24, 2022.

*Primary Examiner* — Antonio Xavier
(74) *Attorney, Agent, or Firm* — Shih IP Law Group, PLLC.

(57) ABSTRACT

Provided is a method of preventing false triggering, which is applied to a wearable device, including: if it is detected that a touch structure is triggered, obtaining pressure values acquired by the at least two pressure sensors, wherein the touch structure and the at least two pressure sensors are disposed on a side wall of a housing of the wearable device, and distances between each of the at least two pressure sensors and the touch structure are different; determining whether all the pressure values acquired by the pressure sensors are in a predetermined reference pressure range. If all the pressure values acquired by the pressure sensors are in the predetermined reference pressure range, respond to an event that the touch structure is triggered, and if not all the pressure values acquired by the pressure sensors are in the predetermined reference pressure range, determine that the touch is false triggering.

10 Claims, 4 Drawing Sheets

(56) References Cited

U.S. PATENT DOCUMENTS

| | | | |
|---|---|---|---|
| 2019/0015045 A1 | 1/2019 | Li | |
| 2019/0064984 A1* | 2/2019 | Schwartz | G06F 3/04883 |
| 2019/0179487 A1* | 6/2019 | Kong | G06F 3/0418 |
| 2020/0012355 A1* | 1/2020 | Dashevsky | G06F 3/014 |
| 2020/0089400 A1* | 3/2020 | Zarraga | G06F 3/04144 |

FOREIGN PATENT DOCUMENTS

| | | |
|---|---|---|
| CN | 110083247 A | 8/2019 |
| CN | 110672262 A | 1/2020 |
| CN | 111103997 A | 5/2020 |
| CN | 111176387 A | 5/2020 |
| CN | 111459330 A | 7/2020 |
| CN | 111736723 A | 10/2020 |
| CN | 113360027 A | 9/2021 |

\* cited by examiner

METHOD OF PREVENTING FALSE TRIGGERING, WEARABLE DEVICE AND STORAGE MEDIUM

The present disclosure claims the priority of the Chinese Patent Application No. 202110741520.8 entitled "METHOD OF PREVENTING FALSE TRIGGERING, WEARABLE DEVICE AND STORAGE MEDIUM", filed in China Patent Office on Jun. 30, 2021, the entire contents of which are incorporated herein by reference.

TECHNICAL FIELD

The present disclosure relates to the field of device controlling technologies, particularly, to a method of preventing false triggering, a wearable device, and a storage medium.

DESCRIPTION OF RELATED ART

As the intelligent wearable technologies develops, wearable devices such as smart watches and smart bracelets have been widely used. The wearable device is usually equipped with a touch structure such as buttons and scroll wheels, and a user may interact with the wearable device by pressing or rotating the touch structure.

When actually used, there are false triggering to the touch structure caused by misoperation of the user. For example, when the user's hands are supporting on a table, a large area of a housing of a smart watch contacts or is pressed by the skin of the user, and in this situation, false triggering may occur on the crown of the watch. In the field, it is mainly determined whether there is false triggering by analyzing a state of the user (such as whether the user has raised the wrist, whether the user is asleep, and the like), however, the scenarios where false triggering generate according to the state of the user are relatively less. Therefore, it is impossible to accurately identify false triggering.

In view of the above, how to improve the accuracy of identifying false triggering is a technical problem that needs to be solved by those skilled in the art at present.

SUMMARY

An object of the present disclosure is to provide a method of preventing false triggering, a wearable device, and a storage medium, which can improve the accuracy of identifying false triggering.

In order to solve the above technical problem, the present disclosure provides a method of preventing false triggering, which is applied to a wearable device, including: if it is detected that a touch structure is triggered, obtaining pressure values acquired by at least two pressure sensors, wherein the touch structure and the at least two pressure sensors are disposed on a side wall of a housing of the wearable device, and distances between each of the at least two pressure sensors and the touch structure are different; determining whether all the pressure values acquired by the pressure sensors are in a predetermined reference pressure range. If all the pressure values acquired by the pressure sensors are in the predetermined reference pressure range, respond to an event that the touch structure is triggered; and if not all the pressure values acquired by the pressure sensors are in the predetermined reference pressure range, determine that the touch is false triggering, and not respond to the event that the touch structure is triggered.

Optionally, before obtaining the pressure values acquired by the at least two pressure sensors, further including: receiving a reference pressure range setting instruction, and outputting prompt information to prompt a user to trigger the touch structure without false triggering; and obtaining the reference pressure values acquired by the at least two pressure sensors, and setting a reference pressure range according to the reference pressure values.

Optionally, before obtaining the pressure values acquired by the at least t two pressure sensors, further including: acquiring wear state information of the wearable device, wherein the wear state information includes data acquired by at least one of a physical sign sensor, a distance sensor and a motion sensor; determining whether the wearable device is in a wearing state according to the wear state information;

If the wearable device is in the wearing state, obtaining the pressure values acquired by the at least two pressure sensors; and if the wearable device is not in the wearing state, performing a processing strategy correspond to the touch structure being triggered when the wearable device is not worn.

Optionally, before obtaining the pressure values acquired by the at least two pressure sensors, further including: acquiring pressure test values of each of the pressure sensors when the pressure sensor is pressed and released, respectively, and calibrating the pressure sensor according to the pressure test values.

The present disclosure further provides a wearable device, including a touch structure, at least two pressure sensors, a micro control unit and a main control chip, wherein the touch structure and the at least two pressure sensors are disposed on a side wall of a housing of the wearable device, distances between each of the at least two pressure sensors and the touch structure different, and the micro control unit is configured to transmit pressure values acquired by the pressure sensors to the main control chip, and the main control chip is configured to obtain the pressure values acquired by the at least two pressure sensors through the micro control unit if it is detected that the touch structure is triggered, and configured to determine whether all the pressure values acquired by the pressure sensors are in a predetermined reference pressure range.

If all the pressure values acquired by the pressure sensors are in the predetermined reference pressure range, respond to the event that the touch structure is triggered; and if not all the pressure values acquired by the pressure sensors are in the predetermined reference pressure range, determine that the touch is false triggering, and not respond to the event that the touch structure is triggered.

Optionally, the touch structure includes a scroll wheel disposed on the side wall of the housing of the wearable device, and the at least two pressure sensors are disposed on the side wall of the housing and are respectively located on both sides of the touch structure.

Optionally, at least one pressure sensors are disposed on the side wall of the housing where the touch structure is disposed.

Optionally, the touch structure includes a button, and the at least two pressure sensors are disposed on the side wall of the housing and are respectively located on both sides of the touch structure.

Optionally, all the pressure sensors are disposed on a FPC board or a PCB board, and the FPC board or the PCB board is attached to the side wall of the housing of the wearable device.

The present disclosure further provides a storage medium on which a computer program is stored, when the computer program is executed, steps of the method of preventing false triggering are implemented.

The present disclosure provides a method of preventing false triggering, which is applied to a wearable device, including: if it is detected that a touch structure is triggered, obtaining pressure values acquired by the at least two pressure sensors, wherein the touch structure and the at least two pressure sensors are disposed on a side wall of a housing of the wearable device, and distances between each of the at least two pressure sensors and the touch structure are different; determining whether all the pressure values acquired by the pressure sensors are in a predetermined reference pressure range.

If all the pressure values acquired by the pressure sensors are in the predetermined reference pressure range, respond to an event that the touch structure is triggered; and if not all the pressure values acquired by the pressure sensors are in the predetermined reference pressure range, determine that the touch is false triggering, and not respond to the event that the touch structure is triggered.

In the present disclosure, if it is detected that the touch structure is triggered, obtaining pressure values by at least two pressure sensors. Since the touch structure and the at least two pressure sensors are disposed on the side wall of the housing of the wearable device, when the user touches the touch structure, a deformation of the side wall of the housing will change the pressure values acquired by the pressure sensors. In the present disclosure, the distances between each of the at least two pressure sensors and the touch structure are different. Therefore, when the touch structure is triggered normally, the influences to the pressure values acquired by the pressure sensors are different. In the present disclosure, the pressure values acquired by all the pressure sensors are compared with the predetermined reference pressure range, if all the pressure values acquired by the pressure sensors are in the predetermined reference pressure range, it is determined that the touch is not false triggering; and if not all the pressure values acquired by the pressure sensors are in the predetermined reference pressure range, it is determined that the touch is false triggering, and not respond to the event that the touch structure is triggered. The method of preventing false triggering according to the present disclosure can detect false triggering in various scenarios, and improve the accuracy of identifying false triggering.

The present disclosure further provides a wearable device and a storage medium, which have the above beneficial effects, and will not be repeated here.

BRIEF DESCRIPTION OF DRAWINGS

In order to explain the embodiment of the present disclosure or the technical solution of the related art more clearly, the following will briefly introduce the drawings necessary in the description of the embodiments or the prior art. Obviously, the drawings in the following description are only a part of the drawings of the present disclosure. For those ordinary skilled in the art, other drawings may be obtained based on the existing drawings without any creative effort.

DETAILED DESCRIPTIONS

Technical solutions according to the embodiments of the present application will be described as follows in conjunction with the drawings in the embodiments of the present application. It is apparent that the described embodiments are only a part of the embodiments according to the present application, rather than all of the embodiments. Any other embodiments obtained by those skilled in the art based on the embodiments in the present application without any creative work fall in the protection scope of the present application.

As the intelligent wearable technologies develops, methods using, for example, conventional physical buttons gradually cannot meet the requirements of a user and the switching of scenarios, and thus many manufacturers have introduced a method using a touch structure such as a scroll wheel. Since false triggering occurs due to the touch structure is easily stressed, for example, false triggering occurs due to a scroll wheel is easily stressed and rolls (for example, when supporting a table with hands, there will be skin contact and oppression on a large area of a housing). The present disclosure provides a new method of preventing false triggering on a wearable device through following embodiments, which can avoid the above defects with low cost.

Figure 1:
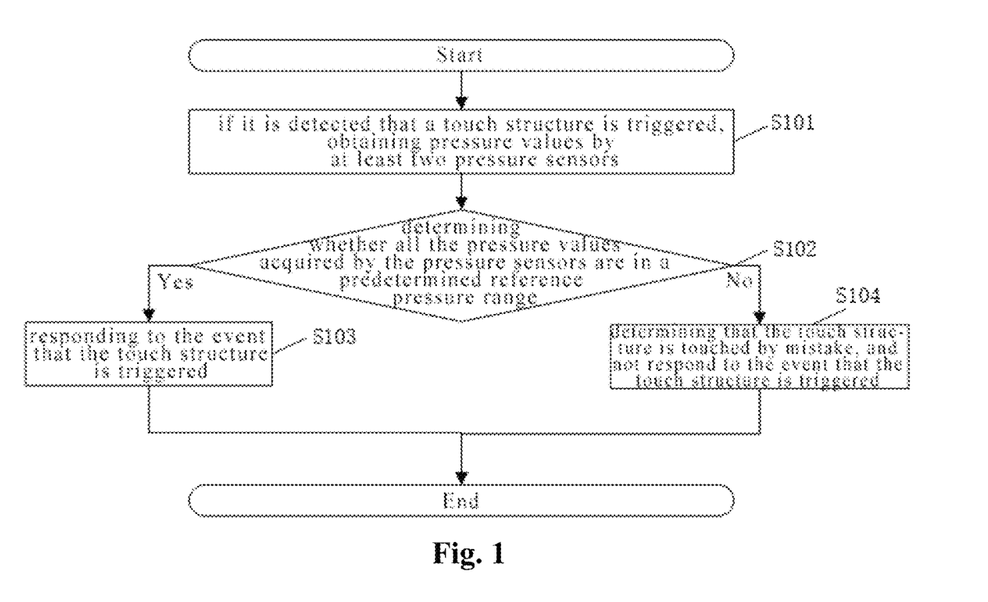
FIG. 1 is a flow diagram illustrating a method of preventing false triggering according to an embodiment of the present disclosure.

Next, referring to FIG. 1, FIG. 1 is a flow diagram illustrating a method of preventing false triggering according to an embodiment of the present disclosure, which may include the following steps.

S101, if it is detected that a touch structure is triggered, obtaining pressure values by at least two pressure sensors.

This embodiment may be applied to a wearable device such as a smart watch, a bracelet, an AR glasses or a VR headset, and the wearable device may include a touch structure, at least two pressure sensors, a micro control unit (MCU) and a main control chip. The pressure sensor is used to detect a pressure value at a specific position and transmit the pressure value back to the main control chip through the micro control unit. The touch structure and the at least two pressure sensors are disposed on a side wall of a housing of the wearable device, and distances between each of the at least two pressure sensors and the touch structure are different. Before obtaining the pressure values acquired by the at least two pressure sensors, calibration operation may also be performed on the pressure sensors. For example, pressure test values of each of the pressure sensors when the pressure sensor is pressed and released, may be acquired, and the pressure sensor may be calibrated according to the pressure test values.

The touch structure in this embodiment may include a button or a scroll wheel, and the user may trigger the touch structure by pressing or rotating. The touch structure is connected with the main control chip, and the main control chip may detect an event that the user triggers the touch structure, and then transmit a data acquiring instruction to the micro control unit to obtain pressure values acquired by respective pressure sensors in the pressure sensors. It should also be noted that the button may be an ordinary depressible button, or may be a depressible and rotatable button. The scroll wheel may be an ordinary rotatable scroll wheel, or may be a rotatable and depressible scroll wheel. When the scroll wheel is rotated, the side wall of the housing is deformed due to stress, and the rotation axis of the scroll wheel may be parallel to a plane where the side wall of the housing is disposed or parallel to a tangent plane of the side wall of the housing. For example, when the housing of the wearable device has a substantially rectangular shape, the rotation axis of the scroll wheel may be parallel to the side wall of the housing where the scroll wheel is disposed. Specifically, the rotation axis of the scroll wheel may be parallel to a long side of the side wall of the housing or parallel to a short side of the side wall of the housing. When the housing of the wearable device has a substantially circular shape, the rotation axis of the scroll wheel is parallel to the tangent plane of the side wall of the housing where the scroll wheel is positioned.

S102, determining whether all the pressure values acquired by the pressure sensors are in a predetermined reference pressure range. If all the pressure values acquired by the pressure sensors are in the predetermined reference pressure range, proceed to S103; and if not all the pressure values acquired by the pressure sensors are in the predetermined reference pressure range, proceed to S104.

The above-mentioned reference pressure range is a pressure range of all pressure sensors in case where the touch structure is normally triggered. In this embodiment, the reference pressure range may be obtained through actual touch test.

It may be understood that when the touch structure is normally triggered by the user, the user's finger has a lager influence to the pressure sensors closer to the touch structure, and thus a greater influence to the pressure values acquired by it. Therefore, false triggering may be identified based on whether the pressure values acquired by the at least two pressure sensors are within the reference pressure range without false triggering.

Specifically, each of the pressure sensors has a predetermined reference pressure range, which is related to a position of the pressure sensor. In this embodiment, after obtaining the pressure values acquired by the pressure sensors, the pressure values actually acquired by each pressure sensor may be compared with the predetermined reference pressure range, if all the pressure values acquired by pressure sensors are in the predetermined reference pressure range, it is determined that the touch is not false triggering; and if not all the pressure values acquired by the pressure sensors are in the predetermined reference pressure range, it is determined that the touch is false triggering.

S103, responding to the event that the touch structure is triggered.

If all the pressure values acquired by the pressure sensors are in the predetermined reference pressure range, it means that there is no false triggering. At this time, the main control chip may respond to the event that trigger the touch structure according to a preset processing program. For example, screen wake-up, volume adjustment, answering the telephone, and the like.

S104, determining that the touch is false triggering, and not respond to the event that the touch structure is triggered.

If not all the pressure values acquired by the pressure sensors are in the predetermined reference pressure range, it means that there is false triggering, and the touch is false triggering, and not respond to the event that the touch structure is triggered.

In the present disclosure, if it is detected that the touch structure is triggered, obtaining pressure values by at least two pressure sensors. Since the touch structure and the at least two pressure sensors are disposed on the side wall of the housing of the wearable device, when the user touches the touch structure, a deformation of the side wall of the housing will change the pressure values acquired by the pressure sensors. In the present disclosure, the distances between each of the at least two pressure sensors and the touch structure are different. Therefore, when the touch structure is triggered without false triggering, the influences to the pressure values acquired by the pressure sensors are different. In the present disclosure, the pressure values acquired by all the pressure sensors are compared with the predetermined reference pressure range, if all the pressure values acquired by the pressure sensors are in the predetermined reference pressure range, it is determined that the touch is not false triggering; and if not all the pressure values acquired by the pressure sensors are in the predetermined reference pressure range, it is determined that the touch is false triggering, and not respond to the event that the touch structure is triggered. The method of preventing false triggering according to the present disclosure may detect false triggering in various scenarios, and can improve the accuracy of identifying false triggering.

As a further introduction to the embodiment illustrated in FIG. 1, there may be a step of detecting a wearing state before performing the detection of preventing false triggering, so as to perform the detection of preventing false triggering when the wearable device is in a wearing state. The specific processes are as follows.

Before obtaining the pressure values acquired by the at least two pressure sensors, acquiring wear state information of the wearable device, wherein the wear state information includes data acquired by at least one of a physical sign sensor, a distance sensor and a motion sensor; determining whether the wearable device is in a wearing state according to the wear state information. If the wearable device is in the wearing state, obtaining the pressure values acquired by the at least two pressure sensors; and if the wearable device is not in the wearing state, performing a processing strategy corresponding to the touch structure being triggered when the wearable device is not worn. The above physical sign sensor may be a sensor used to detect a heart rate of a wearer, or may be a sensor used to detect a body temperature of the wearer, or may also be a sensor used to simultaneously detect the heart rate and the body temperature.

According to the above embodiment, the wearable device can perform the method of preventing false triggering through the above steps S101~S104 when it is detected that the user is wearing normally, thereby can avoid the disorder of the detection caused by false triggering when the user is not wearing.

As a further introduction to the embodiment illustrated in FIG. 1, there may also be an operation of calibrating each of the pressure sensors before obtaining the pressure values acquired by the pressure sensors. For example, before obtaining the pressure values acquired by the at least two pressure sensors, receiving a reference pressure range setting instruction, and outputting prompt information to prompt a user to trigger the touch structure without false triggering; and obtaining the reference pressure values acquired by the at least two pressure sensors, and setting a reference pressure range according to the reference pressure values. Specifically, this embodiment may determine the reference pressure range according to a pressure value range of (1±10%) of the reference pressure values. Through the above method, the reference pressure range without false triggering can be quickly determined.

In addition, if there are pressure sensors disposed in the touch structure, the reference pressure range may be set by the following steps: determining a pressure value interval when each of the pressure e sensors is directly pressed; setting the pressure value interval of the pressure sensors disposed in the touch structure as a reference pressure range of the pressure sensor; and setting a complement of a pressure value interval of pressure sensors not disposed in the touch structure as the reference pressure range of the pressure sensor.

In this embodiment, all pressure sensors may be divided into two types according to whether the pressure sensors are disposed in the touch structure, that is, pressure sensors far away from the touch structure and pressure sensors close to the touch structure, and the pressure sensors close to the touch structure are all pressure sensors disposed in the touch structure. The process of detecting false triggering based on the above method may include the following steps. First, acquiring a pressure value of each of pressure sensors when it is pressed without contact, i.e., obtaining a minimum pressure value Tmin of the pressure sensor. There may be differences between the minimum pressure value Tmin of the pressure sensor, and the pressure sensor may be calibrated based on the above differences. Second, a pressure value interval M acquired when the pressure sensors far away from the touch structure are directly pressed (set according to scenarios of false triggering, for example, 0.5N to 10N) is acquired. Then, a pressure value interval S acquired by the pressure sensors close to the touch structure when the touch structure is triggered (for example, the force is 3N to 8N) is acquired. During the use of the wearable device, if the pressure values actually acquired by the pressure sensors close to the touch structure are within the pressure value interval S, and the pressure values actually acquired by the pressure sensors far away from the touch structure are all outside the pressure value interval M, it is regarded as a normal touch, and other scenarios are determined as false triggering.

Figure 2:
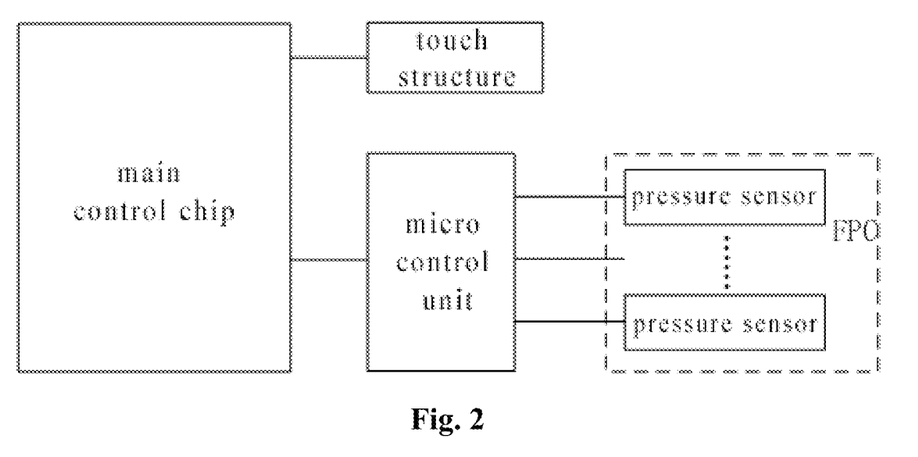
FIG. 2 is a schematic block diagram illustrating a wearable device according to an embodiment of the present disclosure.

Referring to FIG. 2, FIG. 2 is a schematic block diagram illustrating a wearable device according to an embodiment of the present disclosure. As shown in FIG. 2, the wearable device may include a touch structure, at least two pressure sensors, a micro control unit and a main control chip.

The touch structure and the at least two pressure sensors are disposed on a side wall of a housing of the wearable device, distances between each of the at least two pressure sensors and the touch structure are different, and the micro control unit is configured to transmit pressure values acquired by the pressure sensors to the main control chip. In addition, the main control chip is configured to obtain the pressure values acquired by the at least two pressure sensors through the micro control unit if it is detected that the touch structure is triggered, and configured to determine whether all the pressure values acquired by the pressure sensors are in a predetermined reference pressure range. If all the pressure values acquired by the pressure sensors are in the predetermined reference pressure range, respond to the event that the touch structure is triggered; and if not all the pressure values acquired by the pressure sensors are in the predetermined reference pressure range, determine that the touch is false triggering, and not respond to the event that the touch structure is triggered.

In the present disclosure, if it is detected that the touch structure is triggered, the pressure values acquired by the at least two pressure sensors are obtained. Since the touch structure and the at least two pressure sensors are disposed on the side wall of the housing of the wearable device, when the user touches the touch structure, a deformation of the side wall of the housing will change the pressure values acquired by the pressure sensors. In the present disclosure, the distances between each of the at least two pressure sensors and the touch structure are different. Therefore, when the touch structure is triggered without false t the influences to the pressure values acquired by the pressure sensors are different. In the present disclosure, the pressure values acquired by all the pressure sensors are compared with the predetermined reference pressure range, if all the pressure values acquired by the pressure sensors are in the predetermined reference pressure range, it is determined that the touch is not false triggering; and if not all the pressure values acquired by the pressure sensors are in the predetermined reference pressure range, it is determined that the touch is false triggering, and not respond to the event that the touch structure is triggered. The method of preventing false triggering according to the present disclosure may detect false triggering in various scenarios, and improve the accuracy of identifying false triggering.

Further, the above touch structure may include a scroll wheel disposed on the side wall of the housing of the wearable device, and the at least two pressure sensors are disposed on the side wall of the housing and are respectively located on both sides of the touch structure. The above touch structure may include a button, and the at least two pressure sensors are disposed on the side wall of the housing and are respectively located on both sides of the touch structure.

Figure 3:
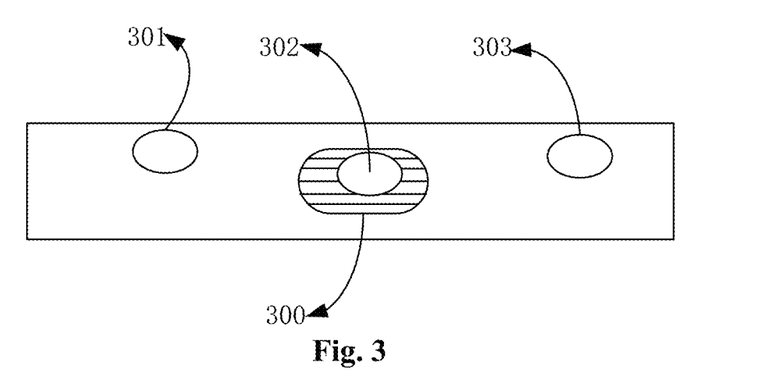
FIG. 3 is a schematic diagram illustrating an arrangement of positions of pressure sensors according to an embodiment of the present disclosure.

Referring to FIG. 3, FIG. 3 is a schematic diagram illustrating an arrangement of positions of pressure sensors according to an embodiment of the present disclosure. As shown in FIG. 3, at least one pressure sensors 302 are disposed on the side wall of the housing where the touch structure 300 is disposed, the other two pressure sensors 301 and 303 are respectively disposed on both sides of the touch structure and symmetrically distributed.

Figure 4:
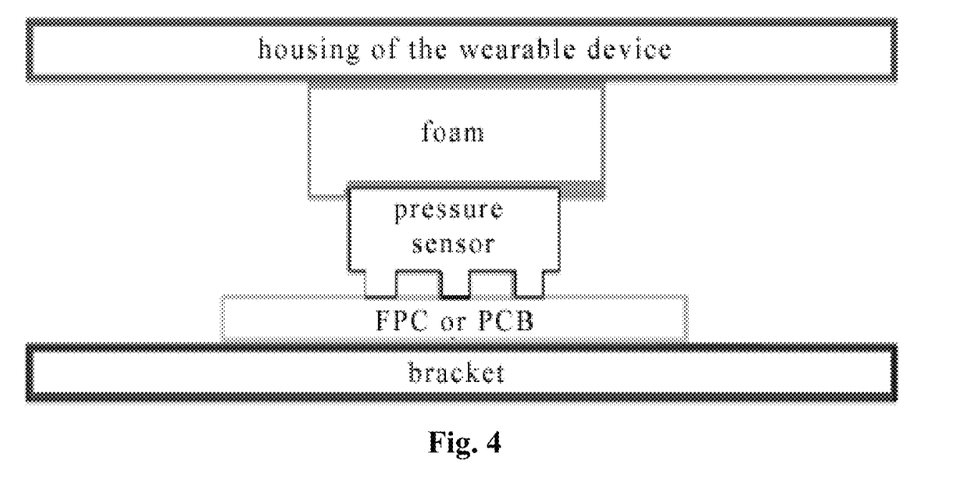
FIG. 4 is a schematic diagram illustrating an embodiment in which a pressure sensor disposed in a housing according to an embodiment of the present disclosure.
Figure 5:
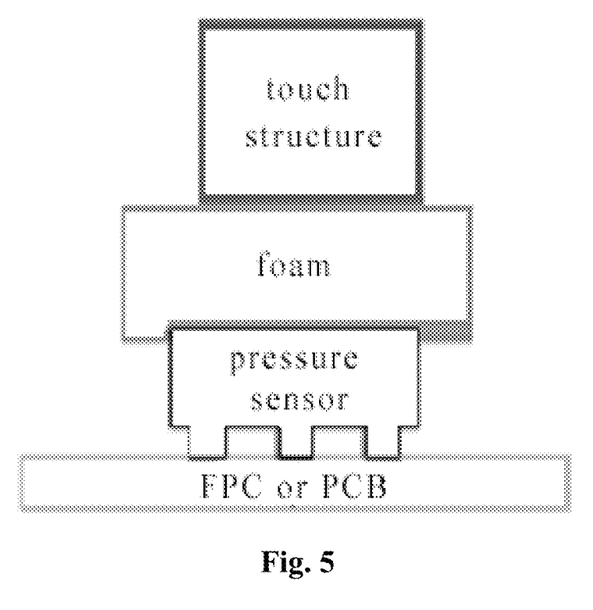
FIG. 5 is a schematic diagram illustrating another embodiment in which a pressure sensor disposed in a touch structure according to an embodiment of the present disclosure.

Further, all the pressure sensors are disposed on a flexible printed circuit (FPC) board or a printed circuit board (PCB) board, and the FPC board or the PCB board is attached to the side wall of the housing of the wearable device. Referring to FIG. 4, FIG. 4 is a schematic diagram illustrating an embodiment in which a pressure sensor disposed in a housing according to an embodiment of the present disclosure. When a housing of the wearable device deforms, a pressure sensor welded on a PCB board or an FPC board will be pressed by using foam, and the PCB board or FPC board is disposed on a bracket. Referring to FIG. 5, FIG. 5 is a schematic diagram illustrating another embodiment in which a pressure sensor disposed in a touch structure according to an embodiment of the present disclosure. When the touch structure is triggered, the pressure sensor welded on a PCB or FPC board will be pressed by foam.

This embodiment provides a design to prevent false triggering based on the detection of the pressure values. By providing the pressure sensors on multiple sides, user operations and false triggering scenarios can be effectively distinguished through signal acquiring and controlling of software.

The present disclosure further provides a storage medium on which a computer program is stored, when the computer program is executed, steps of above embodiments may be implemented. The storage medium may include various media that may store program codes such as a U disk, a mobile hard disk, a read-only memory (ROM), a random access memory (RAM), a magnetic disk, or an optical disk.

The embodiments in the specification are described in a progressive way, each of which emphasizes differences from others, and for the same or similar parts Among the embodiments, reference may be made to each other. Since the device disclosed in the embodiments corresponds to the method disclosed herein, the description of the device is relatively simple, and for relevant matters, reference may be made to the description of the method embodiments. It should be pointed out that, for those skilled in the art, various improvements and modifications may be made to the present disclosure without departing from the principle of the present disclosure, and such improvements and modifications fall within the protection scope of the claims of the present disclosure.

It should also be noted that in the specification, relational terms such as "first" and "second" are merely for distinguishing one entity or operation from another entity or operation, and do not necessarily require or imply that there is an actual relationship or order between these entities or operations. Moreover, terms of "comprise", "include" or any other variants are intended to be non-exclusive, so that a process, a method, an article or a device including a series of elements includes not only these elements but also includes other elements that are not explicitly listed, or also includes elements inherent in the process, the method, the article or the device. Unless otherwise explicitly limited, the statement "comprising a . . . " does not exclude the existence of other identical elements in the process, the method, the article or the device that includes the element.

What is claimed is:

1. A method of preventing false triggering, which is applied to a wearable device, comprising:
    if it is detected that a touch structure is triggered, obtaining pressure values acquired by at least two pressure sensors, wherein the touch structure and the at least two pressure sensors are disposed on a side wall of a housing of the wearable device, and distances between each of the at least two pressure sensors and the touch structure are different;
    determining whether all the pressure values acquired by the pressure sensors are in a predetermined reference pressure range,
    if all the pressure values acquired by the pressure sensors are in the predetermined reference pressure range, respond to an event that the touch structure is triggered, and
    if not all the pressure values acquired by the pressure sensors are in the predetermined reference pressure range, determine that the touch is false triggering, and not respond to the event that the touch structure is triggered.

2. The method of claim 1, before obtaining the pressure values acquired by the at least two pressure sensors, further comprising:
    receiving a reference pressure range setting instruction, and outputting prompt information to prompt a user to trigger the touch structure without false triggering; and
    obtaining the reference pressure values acquired by the at least two pressure sensors, and setting a reference pressure range according to the reference pressure values.

3. The method of claim 1, before obtaining the pressure values acquired by the at least two pressure sensors, further comprising:
    acquiring wear state information of the wearable device, wherein the wear state information comprises data acquired by at least one of a physical sign sensor, a distance sensor and a motion sensor;
    determining whether the wearable device is in a wearing state according to the wear state information;
    if the wearable device is in the wearing state, obtaining the pressure values acquired by the at least two pressure sensors; and
    if the wearable device is not in the wearing state, performing a processing strategy corresponding to the touch structure being triggered when the wearable device is not worn.

4. The method of claim 1, before obtaining the pressure values acquired by the at least two pressure sensors, further comprising:
    acquiring pressure test values of each of the pressure sensors when the pressure sensors are pressed and released, respectively, and calibrating the pressure sensor according to the pressure test values.

5. A non-transitory storage medium on which computer-executable instructions are stored, when the computer-executable instructions are loaded and executed by a processor, steps of the method of claim 1 are implemented.

6. A wearable device, comprising a touch structure, at least two pressure sensors, a micro control unit and a main control chip,
    wherein the touch structure and the at least two pressure sensors are disposed on a side wall of a housing of the wearable device, distances between each of the at least two pressure sensors and the touch structure are different, and the micro control unit is configured to transmit pressure values acquired by the pressure sensors to the main control chip, and
    wherein the main control chip is configured to obtain the pressure values acquired by the at least two pressure sensors through the micro control unit if it is detected that the touch structure is triggered, and configured to determine whether all the pressure values acquired by the pressure sensors are in a predetermined reference pressure range,
    if all the pressure values acquired by the pressure sensors are in the predetermined reference pressure range, respond to an event that the touch structure is triggered, and
    if not all the pressure values acquired by the pressure sensors are in the predetermined reference pressure range, determine that the touch is false triggering, and not respond to the event that the touch structure is triggered.

7. The wearable device of claim 6, wherein the touch structure comprises a scroll wheel disposed on the side wall of the housing of the wearable device, and the at least two pressure sensors are disposed on the side wall of the housing and are respectively located on both sides of the touch structure.

8. The wearable device of claim 7, wherein at least one pressure sensors is disposed on the side wall of the housing where the touch structure is disposed.

9. The wearable device of claim 6, wherein the touch structure comprises a button, and the at least two pressure sensors are disposed on the side wall of the housing and are respectively located on both sides of the touch structure.

10. The wearable device of claim 6, wherein all the pressure sensors are disposed on a FPC board or a PCB board, and the FPC board or the PCB board is attached to the side wall of the housing of the wearable device.

* * * * *